(12) United States Patent
Krishnaprasad et al.

(10) Patent No.: US 8,108,623 B2
(45) Date of Patent: Jan. 31, 2012

(54) POLL BASED CACHE EVENT NOTIFICATIONS IN A DISTRIBUTED CACHE

(75) Inventors: Muralidhar Krishnaprasad, Redmond, WA (US); Gopal Krishan, Hyderabad (IN); Lakshmi Suresh Goduguluru, Andhra Pradesh (IN); Ankur Agrawal, Andhra Pradesh (IN); Balachandar Pavadaisamy, Andhra Pradesh (IN)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 12/463,745

(22) Filed: May 11, 2009

(65) Prior Publication Data

US 2010/0106915 A1 Apr. 29, 2010

Related U.S. Application Data

(60) Provisional application No. 61/108,526, filed on Oct. 26, 2008.

(51) Int. Cl.
 *G06F 12/08* (2006.01)
(52) U.S. Cl. .................. 711/144; 711/141; 711/133
(58) Field of Classification Search .................. 711/144, 711/141, 133, 118, 143, 113, 130, E12.037; 709/218, 214–216; 707/202
See application file for complete search history.

(56) References Cited

U.S. PATENT DOCUMENTS

| | | | |
|---|---|---|---|
| 6,026,413 A * | 2/2000 | Challenger et al. ........... 717/108 |
| 6,336,134 B1 | 1/2002 | Varma | |
| 6,466,949 B2 | 10/2002 | Yang | |
| 6,594,682 B2 | 7/2003 | Peterson | |
| 7,062,515 B1 | 6/2006 | Thomas | |
| 7,139,811 B2 | 11/2006 | Lev Ran | |
| 7,143,143 B1 | 11/2006 | Thompson | |
| 7,162,467 B2 | 1/2007 | Eshleman | |
| 7,254,617 B2 | 8/2007 | Schuh | |
| 7,287,065 B2 * | 10/2007 | Nishi et al. ................... 709/219 |
| 7,464,227 B2 * | 12/2008 | Edirisooriya et al. ........ 711/144 |
| 2006/0143389 A1 | 6/2006 | Kilian | |

OTHER PUBLICATIONS

Fitzpatrick, Brad. "Distributed Caching with Memcached." The Linux Journal. Aug. 1, 2004. Published online at [http://www.linuxjournal.com/article/7451], retrieved on Nov. 10, 2008, 7 pages.
Cao, Leon. "Consistency Control Algorithms for Web Caching." Feb. 9, 2001. Published online at [http://se.uwaterloo.ca/~tozsu/courses/cs748t/surveys/leon.pdf], retrieved on Nov. 10, 2008, 24 pages.
Prince, Chris. "Chapter 16: Distributed File Systems." University of Minnesota Duluth—Department of Computer Science—Lecture Notes for CS 5631: Operating Systems. Published online at [www.d.umn.edu/~cprince/courses/cs5631spring02/notes/Chapter16.ppt], retrieved on Nov. 10, 2008, 11 pages.

* cited by examiner

*Primary Examiner* — David Lam
(74) *Attorney, Agent, or Firm* — Workman Nydegger

(57) ABSTRACT

Systems and methods that supply poll based notification system in a distributed cache, for tracking changes to cache items. Local caches on the client can employ the notification system to keep the local objects in sync with the backend cache service; and can further dynamically adjust the "scope" of notifications required based on the number and distribution of keys in the local cache. The server can maintain the changes in an efficient fashion (in blocks) and returns the changes to clients that perform the appropriate filtering. Notifications can be associated with a session and/or an application.

19 Claims, 11 Drawing Sheets

POLL BASED CACHE EVENT NOTIFICATIONS IN A DISTRIBUTED CACHE

CROSS REFERENCE TO RELATED APPLICATIONS

This application claims the benefit of U.S. Provisional Application No. 61/108,526 filed on 26 Oct. 2008 entitled "POLL BASED CACHE EVENT NOTIFICATIONS IN A DISTRIBUTED CACHE", the entirety of this application is hereby incorporated by reference. This non-provisional application further relates to U.S. patent application Ser. No. 12/363,505 filed on 30 Jan. 2009, entitled "DISTRIBUTED CACHE ARRANGEMENT" and U.S. patent application Ser. No. 12/420,364 filed on 8 Apr. 2009, entitled "REPLICATION FOR COMMON AVAILABILITY SUBSTRATE" all of the aforementioned patent applications are incorporated herein by reference in their entireties.

BACKGROUND

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example.

Typically, a continuing problem in computer systems remains handling of the growing amount of information or data available. The sheer amount of information being stored on disks or other media for databases in some form has been increasing dramatically. While files and disks were measured in thousands of bytes a few decades ago, now databases of a million megabytes (terabytes) and even billions of megabytes are being created and employed in day-to-day activities.

Furthermore, today applications run on different tiers, in different service boundaries, and on different platforms (e.g. server, desktop, devices). For example, in a typical web application, many applications reside on a server supporting a large number of users; however, some client components of the application can run on desktops, mobile devices, and web browsers, and the like. In addition, advances in connectivity and cheap storage combined with the complexity of software management facilitate on-line services and software-as-a-service. In such services models, applications (and their data) are hosted in central data centers (e.g., referred to as the "cloud") and are accessible and shared over the web.

The distributed applications require support for large number of users, high performance, throughput and response time. Such services orientation also requires the cost of service to be low, thereby requiring the scalability and performance at low cost.

A further challenge in implementing storage systems is support for distribution and heterogeneity of data and applications. Applications are composing (e.g. mashups) data and business logic from sources that can be local, federated, or cloud-based. Composite applications require aggregated data to be shaped in a form that is most suitable for the application. Data and logic sharing is also an important requirement in composite applications.

As explained earlier, data/applications can reside in different tiers with different semantics and access patterns. For example, data in back-end servers/clusters or in the cloud tends to be authoritative; data on the wire is message-oriented; data in the mid-tier is either cached data for performance or application session data; and data on the devices can be local data or data cached from back-end sources. With the costs of memory falling, considerably large caches can be configured on the desktop and server machines. With the maturity of 64-bit hardware, 64-bit CPUs are becoming mainstream for client and server machines. True 64-bit architectures support 64-bit CPUs, data or address buses, virtual addressability and dramatically increase memory limits (to $2^{64}$ bytes). Operating systems (e.g. Windows, Linux) are also upgraded to support and take advantage of 64 bit addressspace and large memories.

For example, desktops can be configured with 16 GB RAM, and servers can be configured with up to 2 TB of RAM. Large memory caches allow for data to be located close to the application, thereby providing significant performance benefits to such applications. In addition, in a world where hundreds of gigabytes of storage is the norm, the ability to work with most data in memory (large caches), and readily shift such data from tables/trees to graphs of objects is the key to programmer productivity for next generation applications. Moreover, supplying notifications to clients for continuously changing data in a highly available store remains inefficient, and cannot be readily tailored to requirements of an application.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for a poll based notification component that tracks changes for items cached in a distributed store, via employing filtering sub-systems at different levels, to dynamically adjust scope of notifications (e.g., to a key level, a region level, and a cache level based on number of keys that tracking is desired thereon). Typically, in such distributed store data can be distributed or partitioned amongst the various instances, wherein each instance can be responsible for a set of partitions of data and referred to as the "primary" node for those data partitions. In addition, there can exist one or more backups being kept for each partition also spread across the cache. Such instances hold the backup partitions, which can be referred to as secondary nodes.

A partition can also represent a range of ids that are mapped to different nodes. Moreover, regions and keys can be hashed to an ID, wherein keys are then hashed to a region that is further hashed to a space id. The ID can then determine which partition it maps to (based on the id range of the partition), for mapping to a node, for example.

Based on items to be stored, types of regions in form of region and default can be defined—wherein for all data items keys are obtained and hashed identifications mapped into partitions in form of key ranges. Such partitions can further be taken and spread onto different machines that form the distributed store.

In a related aspect, the distributed store can include a plurality of networked machines or cluster of nodes that employ a Common Availability Substrate (CAS) for data transport/consistency operations; hence rendering the distributed store scalable and available. Such CAS can further supervise join/leave operations for nodes that in part form the distributed store (e.g., monitoring health of nodes, managing life cycles of nodes, creating a primary node on another machine). Accordingly, a server can efficiently maintain changes to cached data (e.g., in forms of blocks) and further return changes to clients, and hence monitor such changes at each of the designated levels. The notification component can further be included on the server and/or client side, wherein the client can poll the necessary servers in the partitioned cache.

In a related aspect, the notification component can include a selection component that optimizes operations via designating a subset of nodes/servers based on partitions and keys positioned therein—wherein providing notifications can be limited to such designated partitions. The client can register for notifications on changes to the named cache, region or a specific key, for example. Furthermore, the local cache on the client can employ the notification component to keep the local objects in sync with the backend cache service.

According to a further aspect, the notification component can spread across the client and server process spaces. On the server side, the notification component can further include a notification manager unit as part of the notification system, to generate notification events for the operations occurring on the cache items and regions (for which notifications are requested). The notification manager unit can further arrange the notifications such that they are readily pulled by the clients. Moreover, on the client side, the notification subsystem and notification registration requests can be stored in a sorted type (e.g., dictionary like) structure. Such an arrangement can also contain notification requesting threads that periodically pull the notifications from the cache server.

In another aspect, each update operation performed obtains a unique sequence number represented by the Logical Sequence Number (LSN) associated with a partition. Such LSN can be generated as part of a replication process (e.g., by noting the current sequence number for operations before the enumeration is begun; and typically returning those items in the partition wherein associated LSN is less than the start LSN), and can be employed to determine the order of the operations within a partition. A partition can also represent a range of ids that are mapped to different nodes. Moreover, regions and keys can be hashed to an ID, wherein keys are then hashed to a region that is further hashed to a space id. The ID can then determine which partition it maps to (based on the id range of the partition), for mapping to a node, for example. It is to be appreciated that other queues independent of the replication process can also be employed.

According to a further aspect of the polling approach, the client can keep track of the change sequence number (e.g., the LSN) per partition. When a user registers a key level notification, such can be translated into the partition that the key belongs to, followed by looking up the current LSN on that partition and a storing thereof on the client side. Hence, a next time the "polling" component needs to poll, the machine that contains such a partition is also polled to return all events from the LSN being stored. For example, if the client is aware that for Partition P1 and the last LSN is 20, next time a polling component proceeds around, it will send a request to a node containing partition P1 and the Last seen LSN (20). Subsequently, the server responds back with the list of events that is known since LSN 20. The client can then update its last LSN to the latest LSN it has observed. Moreover, the server can also be optimized to store the lists in a compressed format.

In a related aspect, the server side filtering can also be employed to improve performance. If there exists a large number of operations and the client is interested in very few operations (e.g., a single key when there has been numerous changes to a partition), then it can be efficient for the client to perform filtering on the server. As such, the server can apply the simple filters on the queue before returning the event list to the client. The client-server communication can also be optimized by the client sending a group of partition requests to each server in parallel. The cache level notifications enable the clients to listen to changes for all keys and regions being performed on the cache. The regions being added or deleted can also be considered a cache event. Such allows the applications to use "regions", which are containers as first class objects and track their creation and deletion.

It is to be appreciated that the local cache can contain any number of keys. As such, by subscribing to the suitable or "right" level of notification, the subject innovation can significantly improve performance. The local cache can subscribe to the notification system to listen to key level changes. If the number of keys in a partition exceeds a predetermined threshold, it subsequently switches to employing partition level notification. Similarly if the number of keys in a partition falls below a threshold it will drop to using key level notification. Moreover, if notification misses occur, the local cache will purge itself to avoid inconsistent data.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
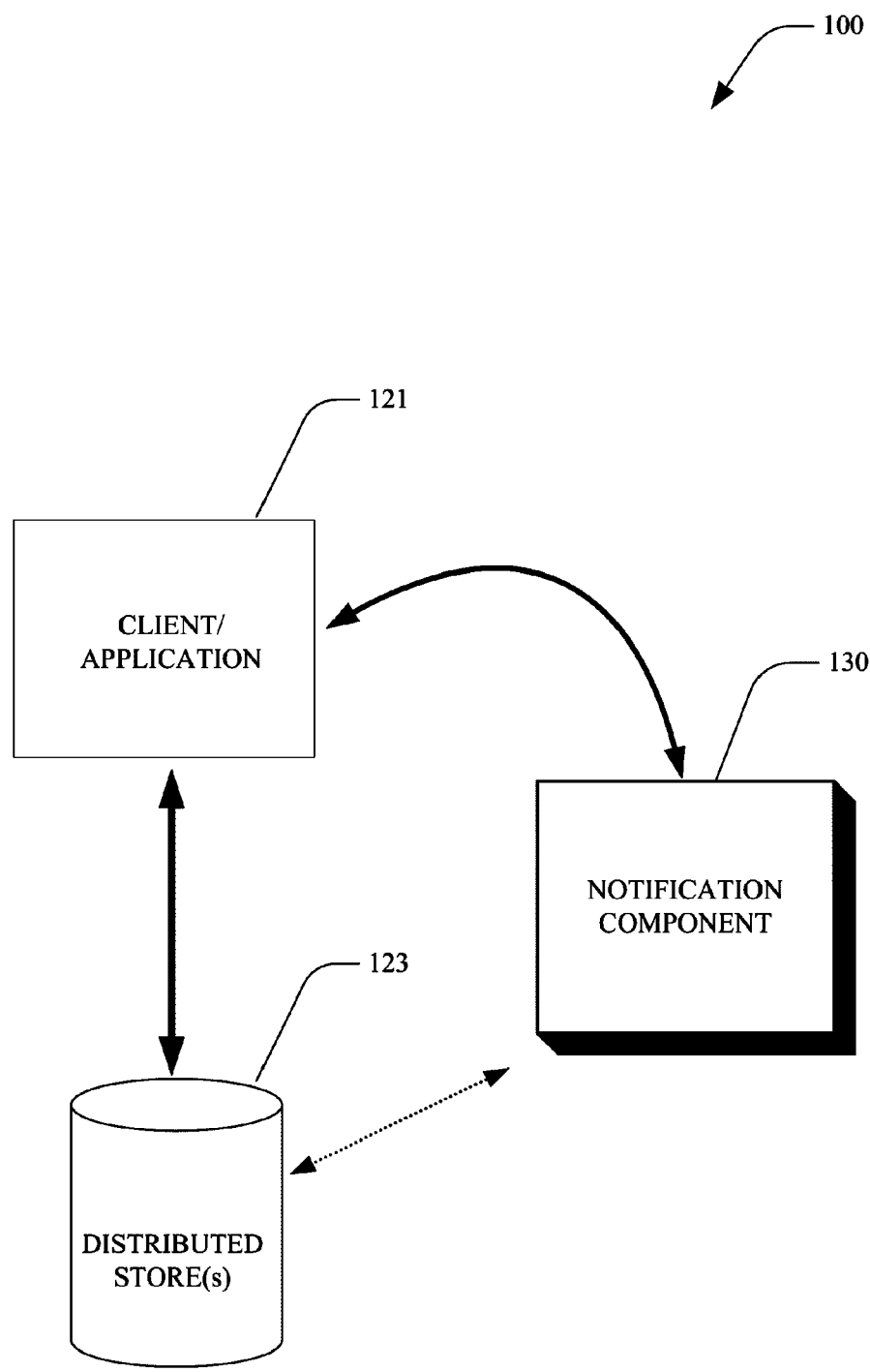
FIG. 1 illustrates a block diagram of a notification system in a distributed cache in accordance with an aspect of the subject innovation.

FIG. 1 illustrates an exemplary notification system 100 according to an aspect of the subject innovation. The notification system 100 can be a poll based notification system that tracks changes to items cached in a distributed store 123 (e.g., a plurality of networked machines or cluster of nodes). Such notification system 100 can employ filtering at various levels, to dynamically adjust scope of notification (e.g., to a key level, a region level, a cache level, and the like)—based on number of keys that tracking is desired thereon. Accordingly, the server can efficiently maintain changes (e.g., in forms of blocks) and further return changes to client/application 121, and hence monitor the changes at each of the designated levels.

The notification component 130 can further be spread across process spaces of the client 121 and server. On the server side, the notification component 130 can generate the notification events for the operations occurring on the cache items and regions, for which notifications are requested. It also arranges them such that they can be readily pulled by the clients 121. On the client side 121, notification registration requests can be stored in a sorted (e.g., dictionary) structure. It also contains a notification requesting thread that periodically pulls the notifications from the cache server. Likewise, on the server side, the notification component 130 responds to the client request for CacheEvents for partitions it contains. In one exemplary aspect, the notification component can take Notification Events directly from CAS Replication queue.

In general, the CAS provides the distributed store 123 with data transport and consistency operations to render the system 100 scalable and available, and further supervises join/leave operations for nodes that in part form the distributed store 123 (e.g., monitoring health of nodes, managing life cycles of nodes, creating a primary node on another machine).

As explained earlier, the notification system 100 can employ a pull based model for notification as it can involve minimal changes to server side. Moreover, the notification component 130 can provide an interface for the upper layers to register/unregister notification. On the client side 121, such enables the server to store the client's notification registration requests and to deliver the notification events to the registered clients in the order the notifications are generated. Likewise, on the server side such can collects and store notification appropriately to be sent to the clients 121 on request.

In addition, the notification system 100 can be protocol agnostic, and hence need not presume particular network facility or protocol. Such can facilitate operations when designing for push-based notifications, as such push-based notifications are deemed considerably efficient if multi-cast protocol network is assumed.

According to a further aspect, the user can employ notifications through two mechanisms, namely an explicit API and a session level API. The explicit API involves user registering the notifications with the distributed store client. It is to be appreciated that registering with the client does not imply that the notification metadata resides on the server, and such can be handled transparently. For example for the application level API, there can exist two main classes—wherein the cache class includes the ability to register for cache events and the CacheEvent class is useful for managing the notifications. An exemplary user API can include:

```
// Delegate Signature
public delegate void DataCacheNotificationCallback(
    string CacheName,
    string regionName,
    string key,
    DataCacheItemVersion version,
    DataCacheOperation cacheOperation,
    DataCacheNotificationDescriptor nd);
Enum DataCacheOperation
{
    AddItem = 0x1,
    ReplaceItem = 0x2,
    RemoveItem = 0x4,
    AddRegion = 0x8,
    RemoveRegion 0x10,
    ClearRegion = 0x20,
    EvictItem = 0x40,
    ExpireItem = 0x80
}
    // Region Level (use DEFAULT_REGION for the no-region case)
//
// The filter is a combination of CacheOperation types
e.g. Add | Replace will
// call the callback for both Add and Replace operations.
//
// Methods on the DataCache class
public class DataCache
{
Public DataCacheNotificationDescriptor
    AddCacheLevelCallback(DataCacheOperation filter,
                DataCacheNotificationCallback clientCallback);
Public DataCacheNotificationDescriptor
    AddRegionLevelCallback(string region,
            DataCacheOperation filter,
                DataCacheNotificationCallback clientCallback);
Public DataCacheNotificationDescriptor
    AddItemLevelCallback(string key,
            DataCacheOperation filter,
                DataCacheNotificationCallback clientCallback);
Public DataCacheNotificationDescriptor
    AddItemLevelCallback(String key,
            DataCacheOperation filter,
                DataCacheNotificationCallback clientCallback,
            String region);
    public void
RemoveCallback(DataCacheNotificationDescriptor notify);
// This is useful if the cache lost notifications -
    // we call this once per partition
    public DataCacheNotificationDescriptor
        AddFailureNotificationCallback(
            DataCacheFailureNotificationCallback failureCallback);
// Key Level At the time of insertion
Cache.Put(,...,...,... int filter, CacheChangeDelegate
delegate);
//
```

Likewise, for session level APIs, the subject innovation can support session level notifications, wherein the notifications can be supplied with a session state that can further be reused. The CacheEvent object is serializable and can be stored along with other session state. When the session moves to a different machine, the application should re-register the notification on that machine using the registerEvent act.

Moreover, for local cache invalidations, the local cache implementation can employ the notification subsystem, if configured, on the client to register to listen for changes to the regions (partitions) that it cares for and then employs such to invalidate the objects. It will filter for Replace/Remove/Evict/DeleteRegion operations only.

In one aspect, the Cache items maintain the Logical Sequence Number (LSN) (along with a simple time of creation of the partition (epoch) as the version number. The LSNs can typically be generated at the partition level and reused for the replication protocol—wherein the reuse of the LSNs guarantees monotonically increasing versions and also makes comparisons easy to provide snapshot semantics.

In addition, change notifications can be sequentially tracked using these LSNs. The LSNs supplied for notifications can have empty slots due to messages that are required for replication but not required for notifications (e.g. control messages). Such can be handled by employing dummy notifications. The state of the client can be managed by keeping the last notification LSN that the client read. Such state can also be kept on the client or on the server.

Figure 2:
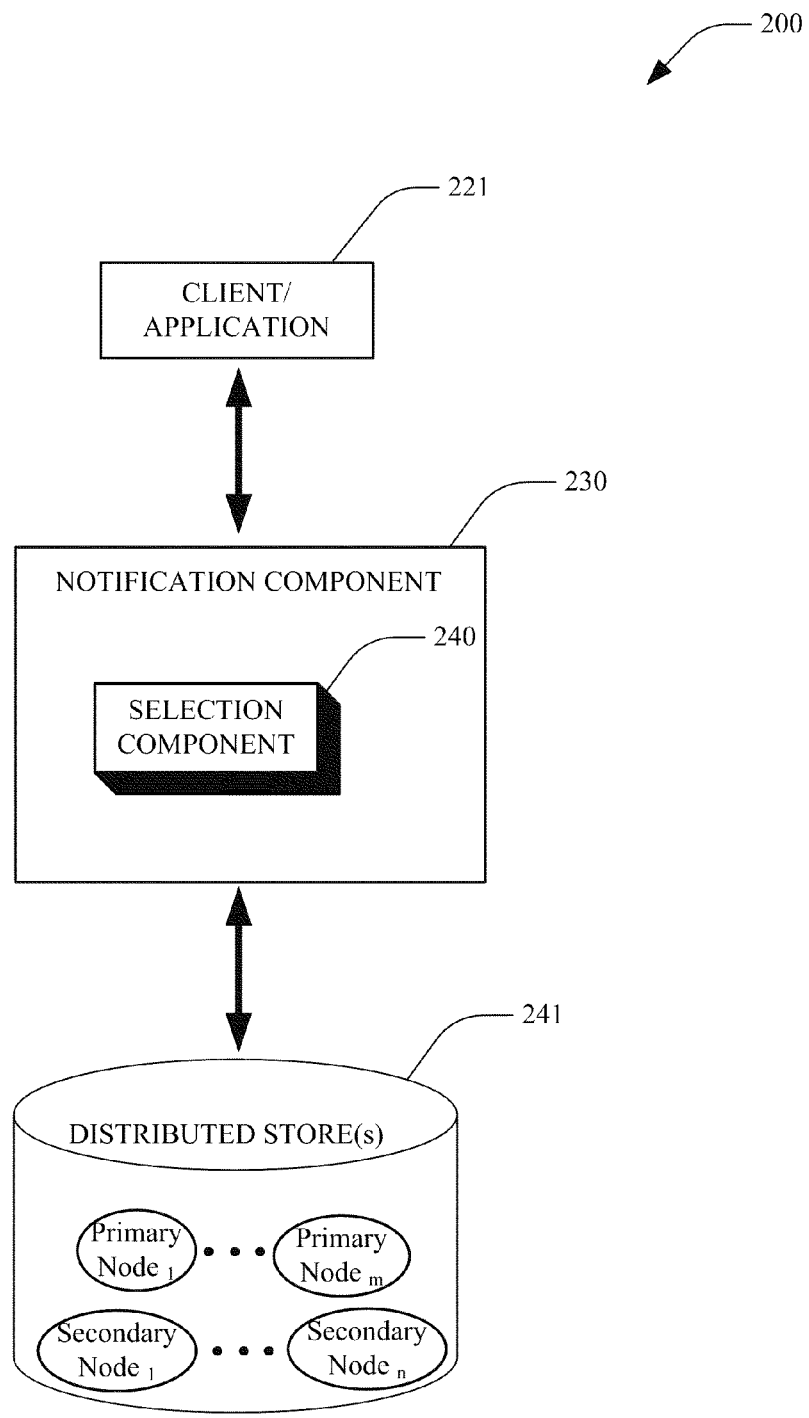
FIG. 2 illustrates a particular notification system that further includes a selection component according to a further aspect of the subject innovation.

FIG. 2 illustrates a particular notification system 200 according to a further aspect of the subject innovation—wherein the notification component 230 can further include a selection component 240 that designates a subset of nodes/servers in the distributed store(s) 241, based on partitions and keys positioned therein. Such subset of nodes servers can include primary nodes 1 to m, where m is an integer—wherein the primary nodes can represent most updated version of data), and secondary nodes (1 to n, where n is an integer), to represent backup for the data. By designating a subset of servers to poll—as opposed to polling all servers upon occurrence of a change—tracking operation can be optimized.

The client 221 can register/de-register for notifications interested in. Moreover, when events occur that clients 221 have shown interest therein, associated delegates can be called. In addition, the server typically does not maintain a client state—hence minimizing change/processing. On the server side, a notification manager unit (not shown) associated with the notification component 230 can responds to the client request for CacheEvents for partitions it contains. Such notification manager unit can further take Notification Events directly from a queue associated with common availability substrate (CAS) Replication, which represents operations for data transport/consistency, to render the distributed store scalable and available.

According to a further aspect, on the server side, the notification manager unit responds to the client request for CacheEvents for partitions it contains. Moreover, the notification manager unit can take Notification Events directly from a replication subsystem, employed for replicating data for high availability or other purposes. Moreover, each update operation performed can obtain a unique sequence number represented by the Logical Sequence Number (LSN) associated with a partition. Such LSN can be generated as part of a replication process (e.g., by noting the current sequence number for operations before the enumeration is begun; and typically returning those items in the partition wherein associated LSN is less than the start LSN), and can be employed to determine the order of the operations within a partition. A partition can also represent a range of ids that are mapped to different nodes. Furthermore, regions and keys can be hashed to an ID, wherein keys are then hashed to a region that is further hashed to a space id. The ID can then determine which partition it maps to (based on the id range of the partition), for mapping to a node, for example.

In a further aspect of the polling approach, the client can keep track of the change sequence number (e.g., the LSN) per partition. When a user registers a key level notification, such can be translated into the partition that the key belongs to and then lookups the current LSN on that partition and store it on the client side. Accordingly, the next time the "polling" component needs to poll, the machine that contains such partition is also polled to return all events from the LSN being stored. For example, if the client 221 is aware that for partition P1, the last LSN is 20, then the next time the polling component proceeds around, it will send the request to the node containing partition P1 and the Last seen LSN (20). Subsequently, the server responds back with the list of events that is known since LSN 20. The client then updates its last LSN to the latest LSN that it has observed. Moreover, the server can also be optimized to store the lists in a compressed format. For example, instead of maintaining a separate list of changes it can:

a) obtain it from the replication queue that is already maintained for the purposes of availability and load balancing; wherein memory and the queue is reused; and/or b) Compress the list into cache event blocks. Such cache event blocks can include start and end LSN noted on them. For example, when a client requests for a notification starting from LSN having number 20 and the server has a block starting from 15-30, it will send the block. Hence, the client can ignore the events from 15-20 and process the remainder. It is to be appreciated that such queue can also remain independent of the replication queue, and be independently defined, wherein the queue maintains track of all changes occurring. The changes can further include maintaining track of key operations and/or new value/old value of data.

Accordingly, by maintaining cache events as blocks, one can save on memory and scale the processing, since the network bandwidth usage also becomes lower. Moreover, different blocks can be maintained—for adds, removes and updates so that clients can request the appropriate event and obtain them efficiently, and mitigate excessive messages. In a related aspect, the server side filtering can also be employed to improve performance. If there exists a large number of operations and the client is interested in relatively few operations (e.g., a single key when there has been numerous changes to a partition), it becomes more efficient for the client to perform a filtering operation on the server. Hence, the server can apply the simple filters on the queue before returning the event list to the client. The client-server communication can also be optimized by the client sending a group of partition requests to each server in parallel. The cache level notifications enable the clients to listen to changes to all keys and regions being performed on the cache. The regions being added or deleted can also be considered a cache event. Such allows the applications to employ "regions", which are containers as first class objects and track their creation and deletion.

It is to be appreciated that the local cache can contain any number of keys. As such, subscribing to the suitable or "right" level of notification can improve performance significantly. The local cache subscribes to the notification system to listen to key level changes. If the number of keys in a partition exceeds a certain threshold, then it switches to using partition level notification. Similarly if the number of keys in a partition falls below a threshold it will drop to using key level notification. Moreover, if notification misses occur, the local cache can purge itself to avoid inconsistent data.

Figure 3:
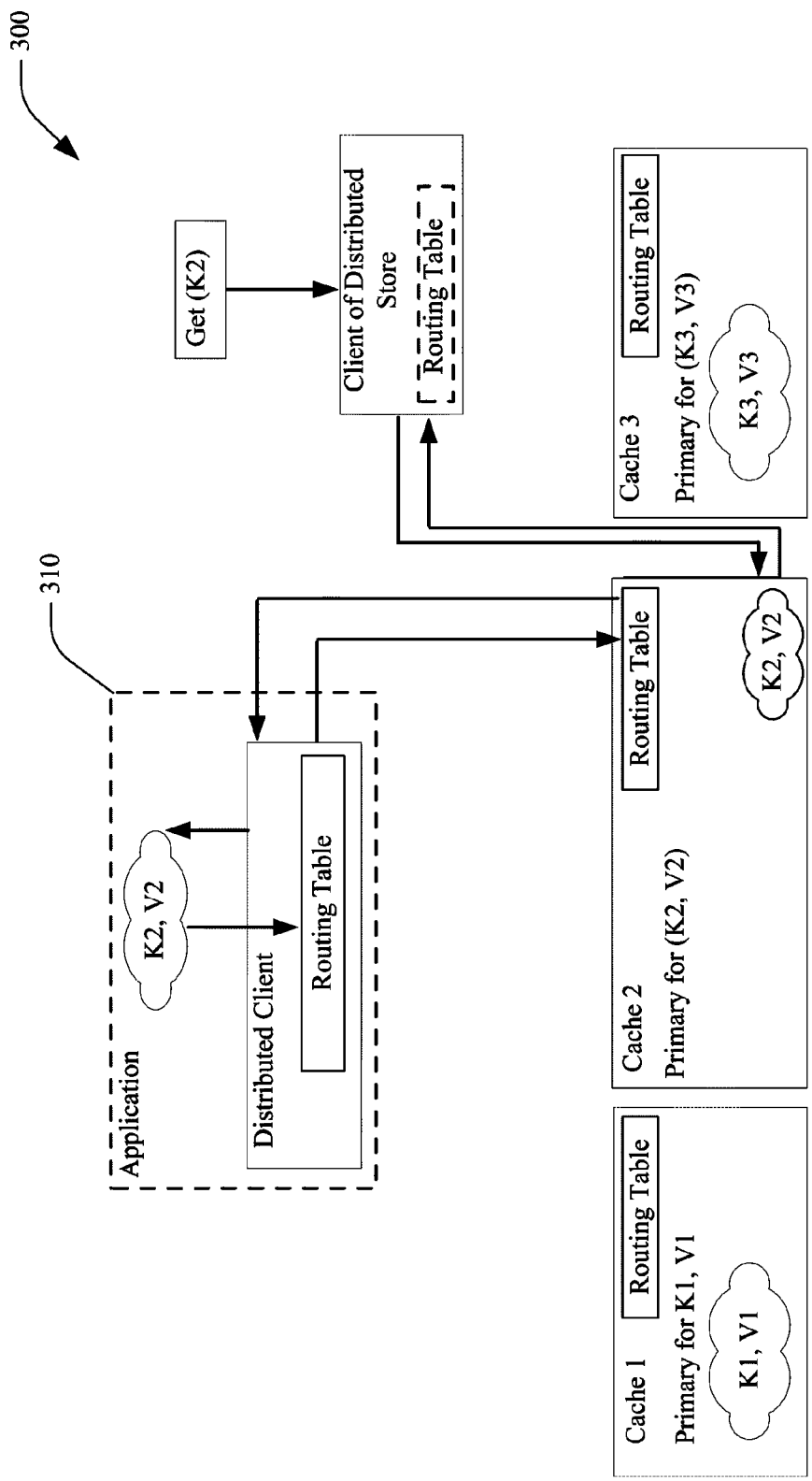
FIG. 3 illustrates a particular notification system that interacts with a plurality of caches according to a further aspect of the subject innovation.

FIG. 3 illustrates a particular notification system 300 that interacts with a plurality of caches according to a further aspect of the subject innovation. An application initially registers to receive notifications for key A and key B. Such registration by the application indicates that whenever key A or key B changes, the application should be notified accordingly. In general, such notification can be either a pull or a push notification, wherein items can be registered and if the data items changes—a poll can be performed periodically. When a cache item changes, the application is notified accordingly.

In the pull based model, the client polls the server to ask for changes similar to Really Simple Syndication (RSS) Feeds. In the push based system model, the server "pushes" information to the registered clients. Both system models are useful for different scenarios. Pull based system model is scalable for a large number of clients as the server need not maintain state about the clients—yet it can increase the network traffic load as the clients have to poll all the servers. In addition, the pull based model can be a waste of network resources if there are very few changes happening to the data. The push based model is efficient if there exists infrequent changes to data and if the user desires the changes to be available as soon as they are made (a disadvantage being that the server needs to keep track of the client state and what notifications each client has received).

The notifications can either be sent in order or can be out of order if parallel processing is required. Moreover, such notifications can include the operations or the data as well—wherein the tracked changes can either be cumulative or net change (as in the current data not all the changes that took place to arrive at this data) or include a sequential list of changes. Both pull and push can guarantee ordering, wherein on the client side, the delegates can be called in sequence.

Regardless of push/pull mechanism, filtering can be performed either on the client or on the server. For example, Client side filtering enables the server to be free of state. Such can be advantageous if there are either few changes on the server or if the client registers for all changes. Moreover, Server side filtering can be deemed more efficient if the client registers for few changes (particularly for predetermined keys).

In such client-server environment, the routing table maps the partition keys, to designate which keys live on which nodes. For example, the routing table can represent a subset of a partition map, wherein for data items keys are obtained and hashed identifications are mapped into partitions in form of key ranges. Initially the application 310 can request notification for keys "K1" and "K3", wherein cache 1 serves as primary for K1, V1; cache 2 serves as primary for K2, V2, and cache 3 serves as primary for K3, V3. Subsequently, the routing table can map keys to partition ranges. Subsequently, nodes associated with such notification request can be polled, wherein such nodes can return list of changes, for example.

In the pull model, clients poll and pull the notifications from the servers. The user API remains similar to the push model, however, the client of the distributed store can poll at frequent intervals. Exponential backoff mechanism can further be employed to ensure that one does not poll servers unnecessarily. Such intervals can be configured and predetermined. Moreover, the client side maintains the last LSN observed (if any), and subsequently asks the server for all notifications after such LSN. If the server has enough log state, it returns all notifications with LSN larger than the client LSN. If not, it can return an error.

Moreover, in the case of a local cache, if notifications are lost, the cache is purged. Likewise, if a cache notification is missed, then one can raise the CacheFailure Notification calls to enable the user to know that they missed some notifications for the set of regions. Each server can maintain the data (e.g., the primary/secondary node) and also maintains the notification logs. Such logs can be maintained by the CAS replication substrate. In case of the routing client, the client explicitly polls each server that it is interested in and obtains all notifications for a partition. The client of the distributed store aggregates all the requests and fetches the appropriate notifications. Subsequently, it filters and calls the appropriate delegates, wherein a simple filtering can be performed on the server side.

Figure 4:
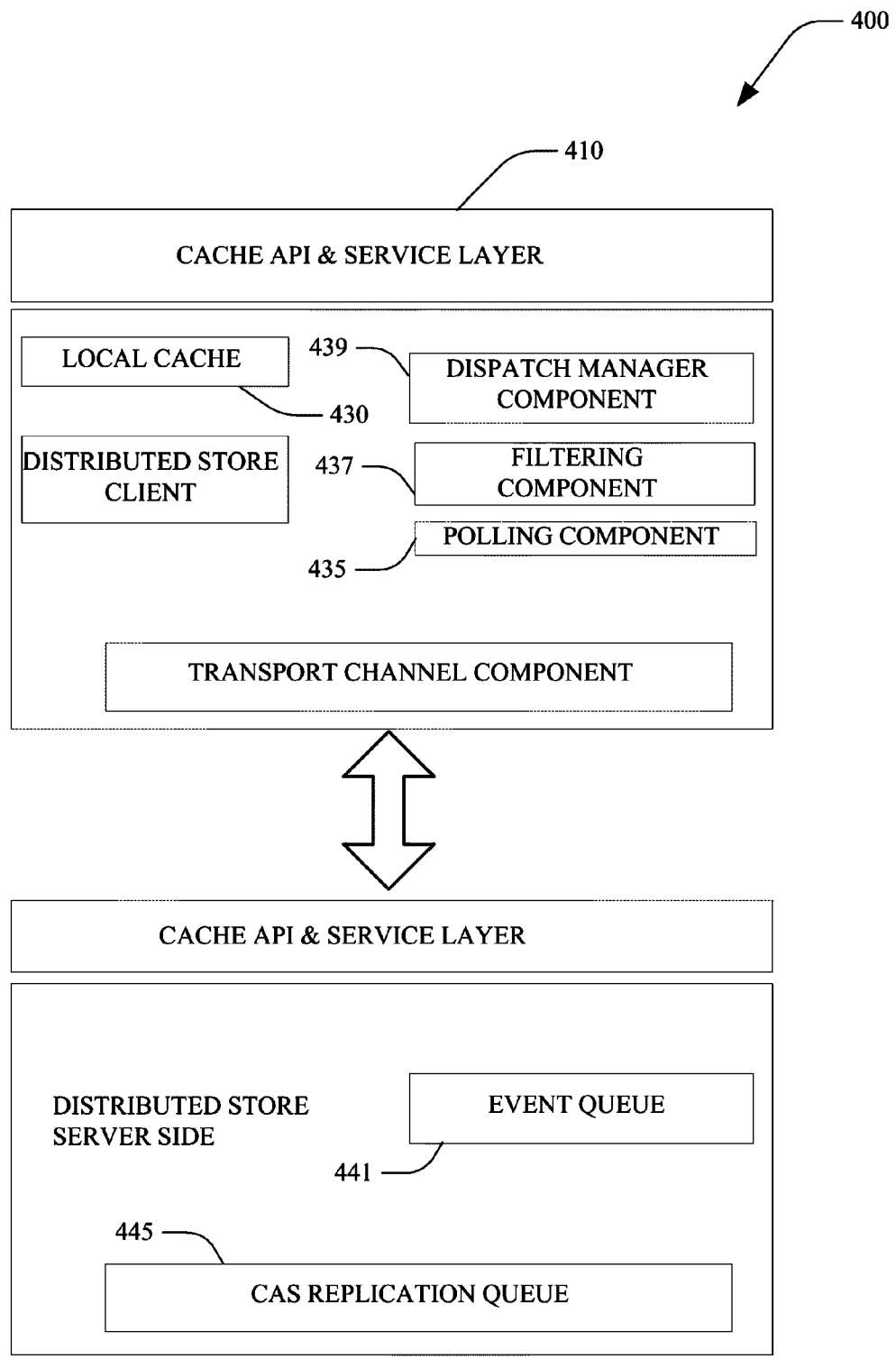
FIG. 4 illustrates an exemplary layering arrangement according to a further aspect of the subject innovation.

FIG. 4 illustrates an exemplary layering arrangement 400 according to a further aspect of the subject innovation, which illustrates interaction between client and a server of a distributed store through a cache API & Service Layer 410 according to an aspect of the subject innovation. The polling component 435 can perform the actual polling and/or actual listening requests in case of push. Likewise, the filtering component 437 can be employed to check if a given notification requires processing or not. Similarly, the dispatch manager component 439 dispatches notification to the caller. In addition the event queue 441 can maintain a list of events that have occurred. Such event queue 441 provides an API to obtain a list of events. Moreover, the queue can maintain cache events by employing the LSN order, and the callers are expected to provide the last LSN to obtain a list of the next set of events. Furthermore, there can exist multiple internal implementations for the Event Queue. One implementation can employ the CAS replication queue 445 directly to fetch the notifications.

In a related aspect, the queue can be a filtered event queue, and such can further facilitate operation when the filter is applied on the server side—wherein the filter may or may not be persistent on the server. The event queue can further be configured, such as sending a maximum number of notifications at any point (e.g., 100 or 1000)—so as to not overwhelm the client or message handlers. Moreover, the queue can send out the LSN that it has, so that the client can re-poll the server. The queue can also report lost events, wherein if the caller asks for events from LSN 10 and the queue only has events from LSN 12, then it reports such loss.

According to a further aspect, the polling component 435 can poll all the servers at regular intervals and maintain the last LSN observed for a partition per named cache. Such polling component 435 can further employ the CAS Client DLL to obtain a list of partitions and servers and batches requests, such that it requests the notifications for all partitions that a server contains. The polling component 435 can further implement exponential back off per partition/server.

The filtering component 437 can maintain hash tables of registered requests for cache level, region or key level events. The filtering component 437 can have APIs for taking in a cache event and determine if it is of interest. For example, in the client scenario described above, the polling component 435 can obtain a batch of events then calls the filtering component to filter out the unnecessary ones. The remaining ones can then be sent to the dispatch manager component 439.

Likewise, the dispatch manager component 439 can maintain a queue of events that needs to be dispatched. The dispatch can occur on a single thread per partition—so as to guarantee sequential execution of notifications. The local cache 430 can register itself as a client to the notification system. Moreover, the local cache 430 can register itself for the entire cache and act on the events directly. Put differently, the server side can maintain a list of cache events based on LSNs, and the client polls each server to obtain an updated list of events that have occurred since the last poll. The client can further maintain filters to send the event that is pertinent by the application (e.g., registered thereby). As explained earlier, applications can also register delegates for notifications on any node which may be different from the primary node on which the object resides.

Such layering arrangement 400 can further provide for a scalable system that can be tailored to different types of communication layers such as TCP/IP, and pluggable features can be further enabled for readily adapting to a user's need. The distributed cache implementing the layering arrangement 400 can dynamically scale itself with growth of applications associated therewith, by addition of additional computers as nodes to a cluster of machines. Moreover, a clustering substrate can establish clustering protocols among the plurality of nodes that form the single unified cache. For example, when a node is to join or leave the cluster, requisite operation for adding or leaving the cluster are managed, wherein the distributed component availability substrate can employ such information to manage the operation (e.g., monitoring health of nodes, managing life cycles of nodes, creating a primary node on another machine). In addition, for each node each of the components forming the layering arrangement can be pluggable based on user needs, system requirements, and the like. It is to be appreciated that due to pluggable features supplied by the layering arrangement, users can plug in different types of data managers tailored to users' requirements such as; a transaction data manager or a disk paged data manager, and the like.

In one aspect, the propagation of notifications can be managed in a distributed fashion, to include providing high availability for such notifications when the primary node fails. For example, such can be handled by maintaining a local lookup table indexed by delegate id on the node where the application registers the delegate. The primary node that stores the object maintains the delegate id and the originating node information. When such object changes in the distributed store, the primary node can notify all the originating nodes passing along the delegate id.

Similarly, the lookup table can be employed to call the appropriate delegate, thus providing the change information to the application in a distributed fashion. For example, notifications can be asynchronous and can further be backed up using the same secondary nodes. Accordingly, in the event of failures, the secondary nodes attempt to deliver the pending notifications.

Figure 5:
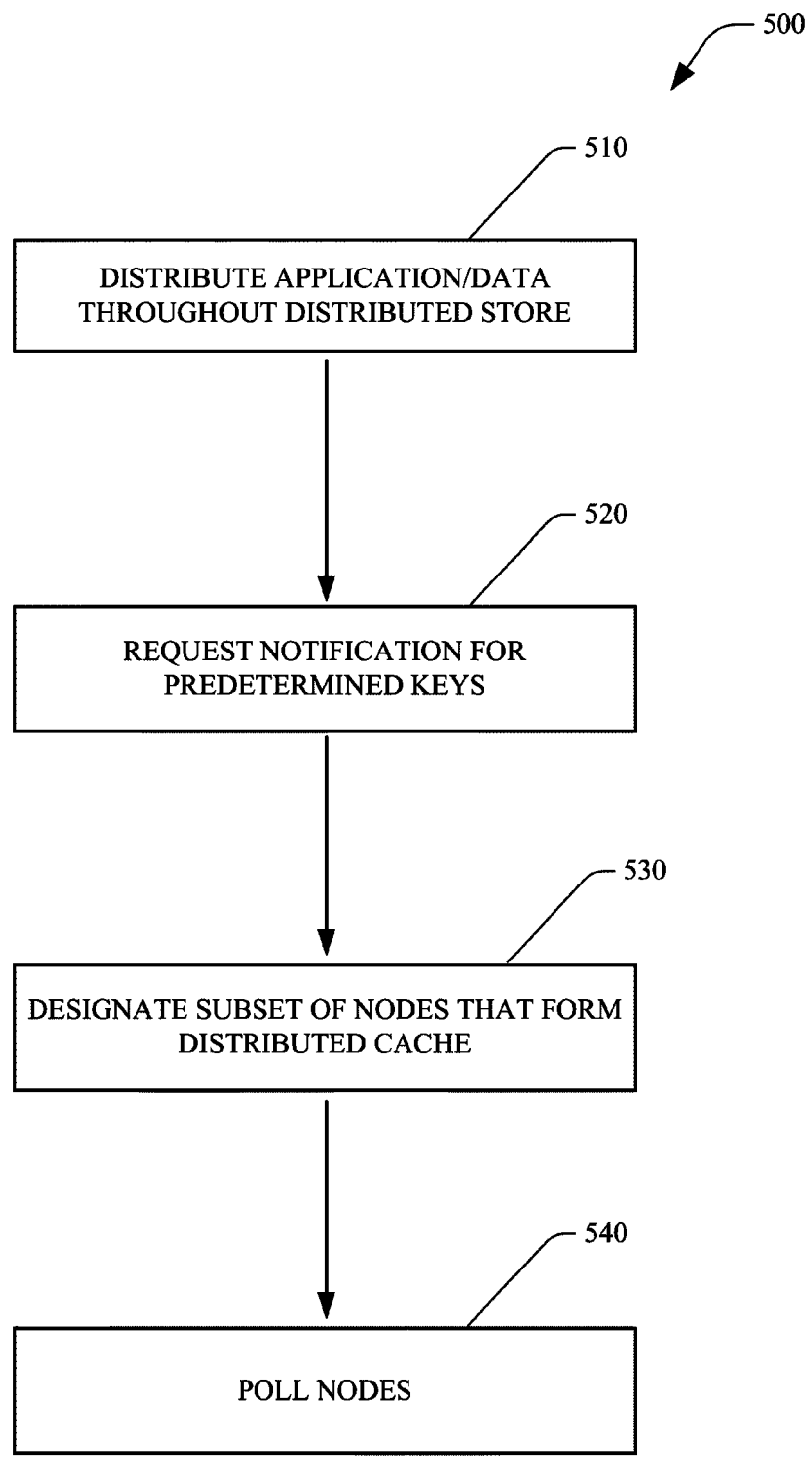
FIG. 5 illustrates a further methodology of designating a subset of nodes/servers based on partitions and keys positioned therein.

FIG. 5 illustrates a methodology 500 of designating a subset of nodes/servers based on partitions and keys positioned therein. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation can be implemented in association with the method illustrated and described herein, as well as in association with other systems and apparatus not illustrated or described. Initially and at 510, applications/data can be distributed throughout a distributed cache, wherein such distributed cache can be scaled depending on the changing requirement of the applications and/or data. Next an application can request notifications for predetermined keys at 520. Subsequently and at 530 a subset of nodes that form the distributed cache can be designated based on partitions/keys positioned therein. At 540, nodes associated with such notification request can be polled, wherein such nodes can return list of changes.

Figure 6:
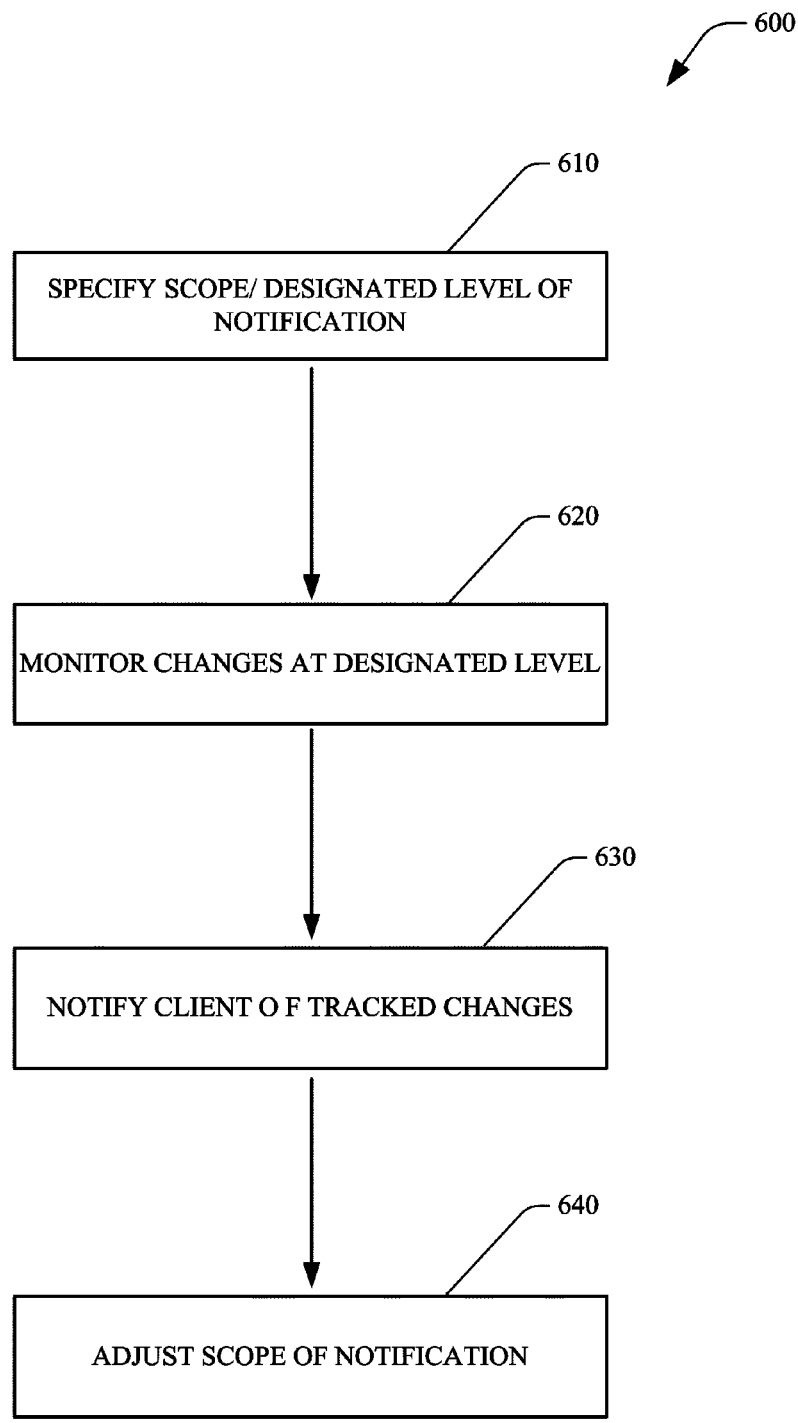
FIG. 6 illustrates a methodology of adjusting a scope of notification according to an aspect of the subject innovation.

FIG. 6 illustrates a further methodology 600 of adjusting a scope of notification in accordance with an aspect of the subject innovation. Initially and at 610, a scope of notification can be specified, wherein such scope of notification can be set to a key level, a region level, a cache level and the like, based on number of keys that tracking is desired thereon. Accordingly, the client can register for notifications on changes to the named cache, region or a specific key. Furthermore, the local cache on the client can employ such notifications to keep the local objects in sync with the backend cache service.

Next and at 620 changes can be monitored at such designated levels as identified by the client/application. Subsequently, and at 630 changes can be identified and the application notified accordingly. At 640, the scope of the notification can be adjusted to a different scope, and changes tracked at such new level. Accordingly, a server can efficiently maintain changes to cached data (e.g., in forms of blocks) and further return changes to clients, and hence monitor such changes at each of the designated levels.

Figure 7:
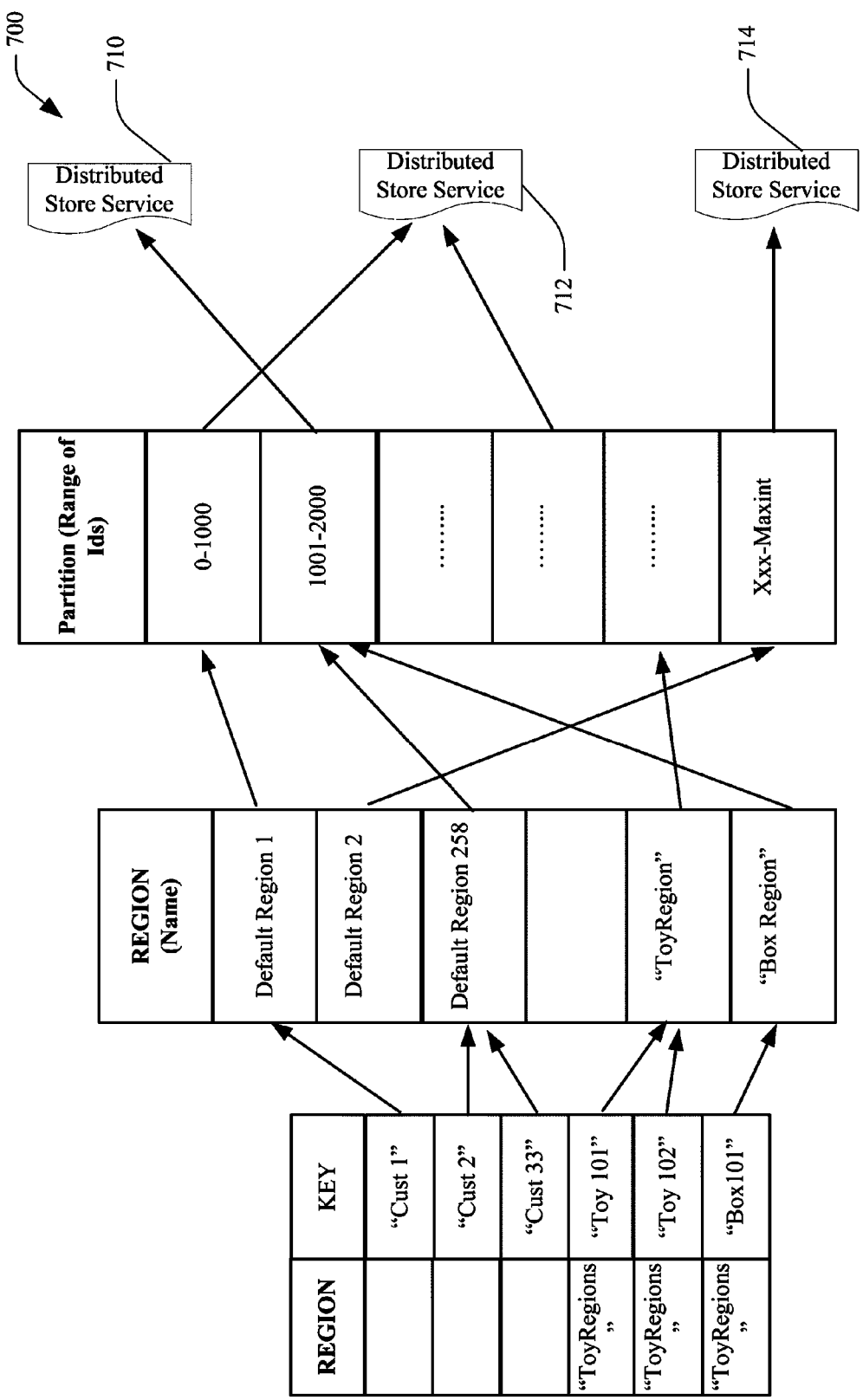
FIG. 7 illustrates a key mapping for ranges of data when mapped to nodes on a distributed store.

FIG. 7 illustrates a key mapping 700 for ranges of data when mapped to nodes on a distributed store(s) 710, 712, 714. Based on items to be stored, such as in case of a toy delivery store for boxes corresponding to the toys, two types of regions in form of region and default can be defined—wherein for all data items keys are obtained and hashed identifications mapped into partitions in form of key ranges. Such partitions can further be taken and spread onto different machines that form the distributed store/services 710, 712, 714. The partition maps can further include both global partition maps and local partition maps. The local partition map can be placed on a node, to supply knowledge about partitions placed on the node. Likewise, the global partition supplies knowledge about all partition maps in the cluster of nodes that form the distributed store. Furthermore, the local cache can maintain items in de-serialized object format and without involving the distributed store. Requests arriving in the local cache can then be synched with primary data being held in the primary node.

Figure 8:
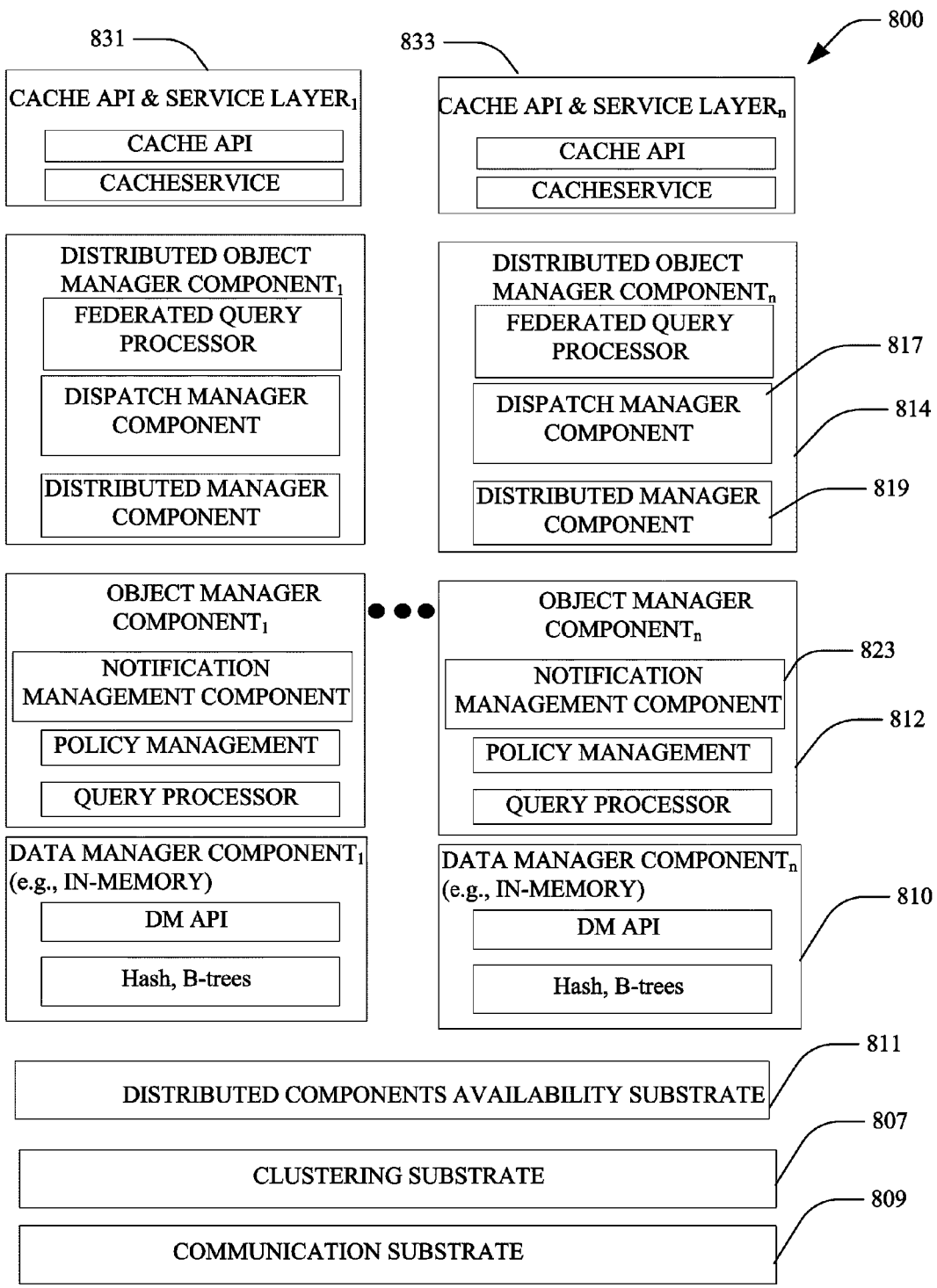
FIG. 8 illustrates a particular layering arrangement for a distributed cache according to a particular aspect of the subject innovation.

FIG. 8 illustrates a particular layering arrangement 800 for a distributed cache according to a particular aspect of the subject innovation. Such layering arrangement enables aggregating memory capacity of multiple computers into a single unified cache, according to an aspect of the subject innovation. As illustrated in FIG. 8, each of the cache nodes 831, 833 (1 to n, n being an integer) the layering arrangement 800, which includes a data manager component 810, an object manager component 812 and a distributed object manager component 814—the set up which can be implemented in a modular fashion—wherein, the distributed object manager component 814 is positioned on top of the object manager component 812, which itself placed on top of the data manager component 810. The data manager component 810 supplies basic data functions (e.g., hash functions), and the object manager component 812 implements object facade thereon including cache objects with the distributed object manager component 814 providing the distribution. As such, the object manager component 812 and data manager component 810 can act as local entities, wherein the distributed object manager component 814 performs the distributions. Moreover, a clustering substrate 807 can establish clustering protocols among the plurality of nodes that form the single unified cache.

As explained earlier, the data manager component 810 (e.g., in memory) provides primitive high performance data structures such as hash tables, Btrees, and the like. Since such data manager 810 is memory bound and all operations of the distributed cache of the subject innovation are atomic, it can typically implement highly concurrent hash tables. Such further facilitates creating the infrastructure for supplying containers and indexes on containers. In addition it provides simple eviction and expiration on these hash structures. It is to be appreciated that due to pluggable features supplied by the layering arrangement 800, users can plug in different types of data managers tailored to users' requirements such as; a transaction data manager or a disk paged data manager, and the like. Likewise, the object manager component 812 provides the object abstraction and implements the concept of named caches and region by employing data structures provided by the data manager.

Similarly, the distributed object manager component 814 employs the local object manager and integrates with the Distributed Components 811 to provide the abstraction of the distributed cache. Core to the distributed cache of the subject innovation is the Distributed Components/availability substrate 811 which provides the transport and data consistency operations to make the system scalable and available. The object distribution component can optionally be implemented as part of a client tier to facilitate dispatching requests (e.g., directly) to the nodes associated with the single unified cache.

In one particular aspect, the distributed object manager component 814 can further include a Dispatch Manager component 817 and a distributed Manager component 819. The Dispatch Manager component 817 can further look up the routing table to dispatch the requests to a primary node (e.g., where a region is located) as part of dynamically scalable distributed cache. Moreover, such dispatch manager component 817 can be also present in the client so that the client can directly dispatch requests to the primary node. For example, the distributed object manager 811 on the receiving node can interact with the partition map to check if the node is indeed designated as the primary node as part of a plurality of nodes associated with the distributed cache, and calls the Object Manager component 814 to perform the operation. In the case of write operations, such distributed object manager component 814 can also communicate with a replicator to replicate the data to the secondary nodes. It can also interact with the failover manager systems (not shown) to clone regions to create new secondary or primary nodes during reconfiguration procedures subsequent to possible failures.

The object manager component 812 can further include a notification management component 823 that tracks changes to regions and objects and relays notifications to delegates listening to those events. Moreover, applications can also register delegates for notifications on any node which may be different from the primary node on which the object resides. The distributed object manager component 814 can further manage the propagation of notifications in a distributed fashion including providing high availability for such notifications when the primary node fails. For example, such can be handled by maintaining a local lookup table indexed by delegate id on the node where the application registers the delegate. The primary node that stores the object maintains the delegate id and the originating node information. When such object changes in the distributed object manager component 814, the primary node can notify all the originating nodes passing along the delegate id.

Similarly, the distributed object manager component 814 associated with the receiver can employ the lookup table to call the appropriate delegate, thus providing the change information to the application in a distributed fashion. For example, notifications can be asynchronous and can further be backed up using the same secondary nodes. Accordingly, in the event of failures, the secondary nodes attempt to deliver the pending notifications, wherein during the primary node failure notifications can be resent—since the primary may not have synchronized the information regarding the delivered notifications before failure. Since all notifications carry the region, key and version information, application can use the version to ignore duplicate notifications.

Likewise, the Availability Substrate 811 provides scalability and availability to systems that contain a storage component associated with the distributed cache of the subject innovation. For example, the availability substrate can include load balancers, fail over managers, replicators and the like. Interacting with such availability substrate 811 is the communication substrate 809 that provides for failure detection of nodes and reliable message delivery therebetween. Moreover, the communication substrate 809 provides the communication channels and cluster management. Such communication substrate 809 can provide callbacks whenever a new node joins the cluster or when a node dies or fails to respond to exchanged messages (e.g., heart beat messages). Moreover, the communication substrate 809 can provide efficient point-to-point and multicast delivery channels, and can further provide reliable message delivery that is required for implementing the replication protocols. For example, the communication substrate 809 supports notifications by maintaining delegate information in cache items and triggering the notification when items are modified. Such component also triggers eviction based on policies defined at the region or named cache level.

Figure 9:
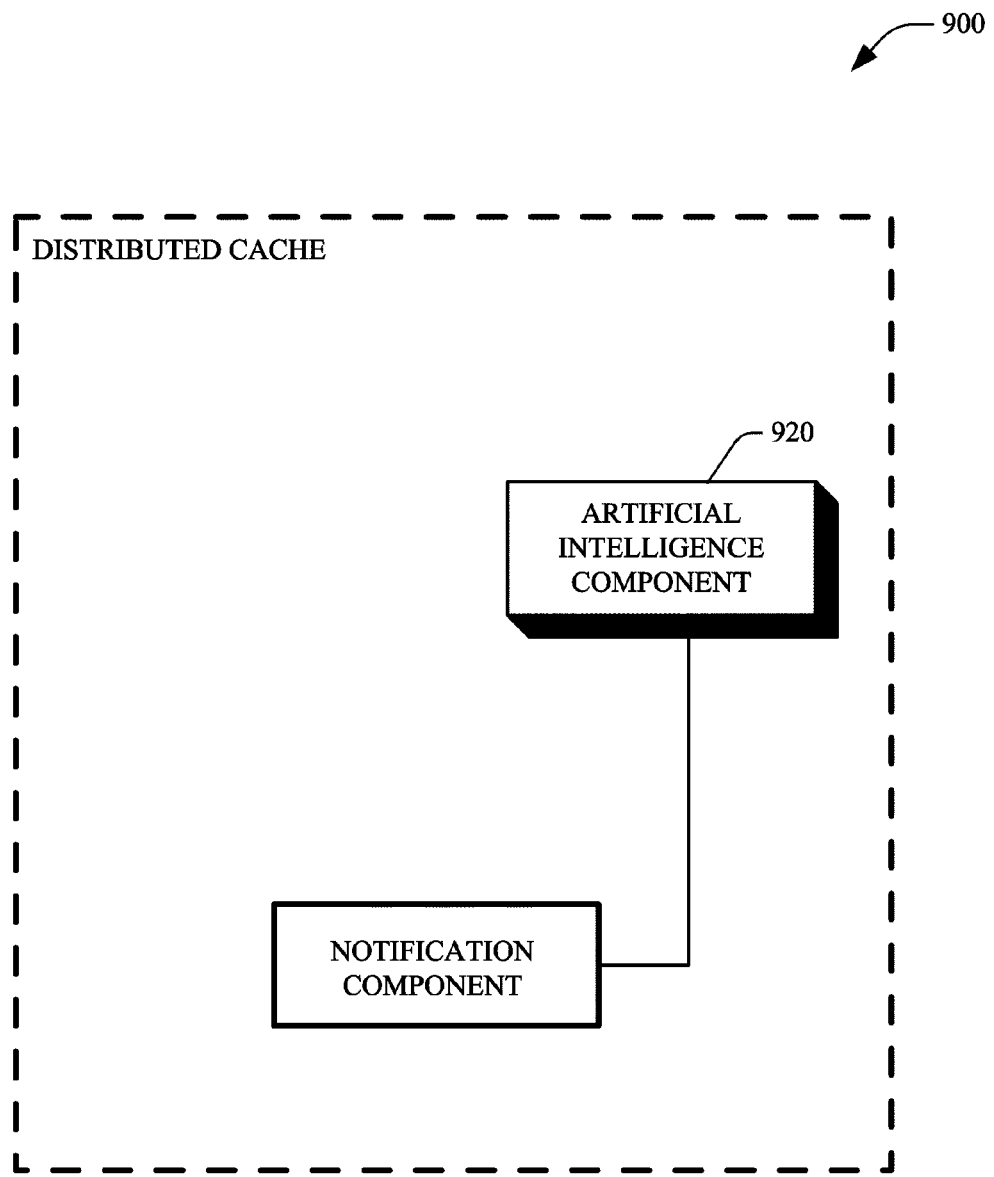
FIG. 9 illustrates an inference component in form of an artificial intelligence component that can be employed to facilitate notifications.

FIG. 9 illustrates an inference component in form of an artificial intelligence (AI) component 920 that can be employed to facilitate notifying in the distributed cache 900 and/or distribute applications. For example, the artificial intelligence component 920 can supply additional analysis with the distributed cache manager to improve distribution and/or scaling of the system. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 920 can employ any of a variety of suitable AI-based schemes as described supra in connection with facilitating various aspects of the herein described invention. For example, a process for learning explicitly or implicitly how or what candidates are of interest, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)$=confidence(class).

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
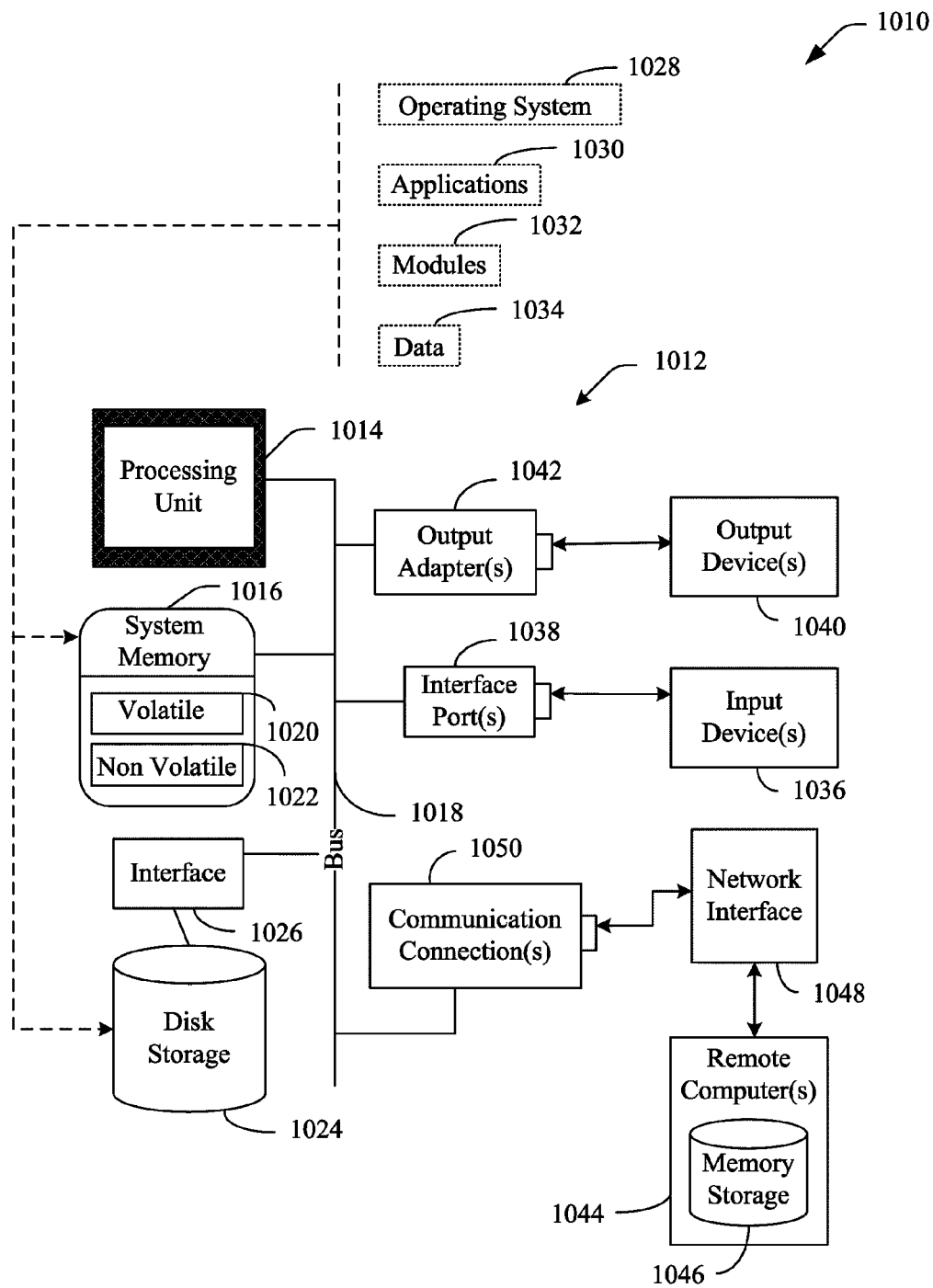
FIG. 10 illustrates an exemplary environment for implementing various aspects of the subject innovation.
Figure 11:
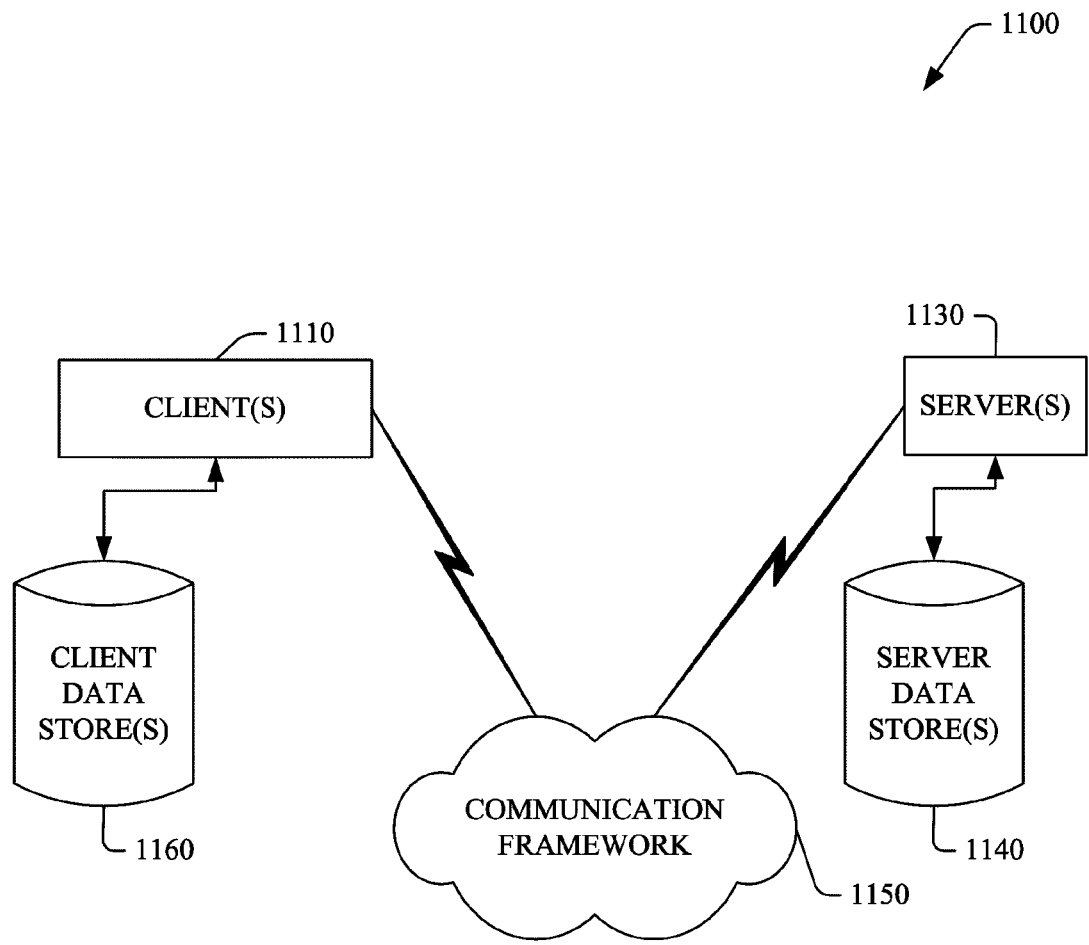
FIG. 11 illustrates a sample computing environment that can be employed for replicating cache according to an aspect of the subject innovation.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules.

As used in this application, the terms "component", "system", "engine" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates a disk storage 1024, wherein such disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed for replicating cache according to an aspect of the subject innovation. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented method comprising:
employing a processor to execute computer executable instructions stored on a computer readable medium to perform the following acts:
tracking changes to cached data in a distributed store via a filtering sub-system;
employing a Common Availability Substrate (CAS) to maintain availability of operations for the distributed data store during the tracking act; and
dynamically adjusting scope of notifications for tracked changes.

2. The computer implemented method of claim 1 further comprising notifying a client(s) of the distributed store regarding tracked changes based on polling a cluster of nodes that form the distributed store.

3. The computer implemented method of claim 2 further comprising registering the client(s) for receiving notifications from a named cache, or a region, or a key or a combination thereof.

4. The computer implemented method of claim 1, the polling further comprising a pull or push model for the distributed store.

5. The computer implemented method of claim 1, the tracking act further comprising maintaining track of: key operations; or values of data; or a combination thereof.

6. The computer implemented method of claim 1, further comprising tracking change sequence numbers per partition.

7. The computer implemented method of claim 1, further comprising maintaining cache events as blocks for optimal transport or processing.

8. The computer implemented method of claim 1, further comprising propagating notifications when a primary node of a partition fails.

9. The computer implemented method of claim 1, further comprising employing routing table to correspond keys with nodes of the distributed store.

10. The computer implemented method of claim 1 further comprising implementing a session based notification that associates a notifying act with a session in the distributed store.

11. A computer implemented system that facilitates tracking data changes in a distributed store comprising:
a processor;
a memory communicatively coupled to the processor, the memory having stored therein computer-executable instructions configured to implement the computer implemented system including:
a plurality of nodes that form a distributed store; and
a notification component that tracks changes to data cached in the distributed store based on a session or an application or a combination thereof; and
a Logical Sequence Number (LSN) generated as part of a replication process associated with a Common Availability Substrate (CAS).

12. The computer implemented system of claim 11, the notification component further comprising a filtering system that adjusts scope of notification.

13. The computer implemented system of claim 11 further comprising a routing table that directs replicated data to a plurality of nodes that form the distributed store.

14. The computer implemented system of claim 11 further comprising a selection component that designates a subset of nodes or servers based on partitions or keys partitioned therein.

15. The computer implemented system of claim 11 the distributed store further comprising
a layering arrangement that supplies an explicit aggregated cache for applications associated therewith, the layering arrangement includes:
a distributed object manager component that facilitates abstraction of the explicit aggregated cache in a distributed environment, to a single unified cache; and
an object manager component that manages policies associated with objects stored in each of nodes that form the single unified cache.

16. The computer implemented system of claim 15 further comprising a data manager component that supplies storage data structures for the objects.

17. The computer implemented system of claim 15 further comprising a clustering substrate that establishes clustering protocols between nodes that form the single unified cache.

18. A computer implemented system that facilitates tracking data changes in a distributed store comprising:
a processor;
a memory communicatively coupled to the processor, the memory having stored therein computer-executable instructions configured to implement the computer implemented system including:
a plurality of nodes that form a distributed store; and
a notification component that tracks changes to data cached in the distributed store based on a session or an application or a combination thereof, the distributed store further comprising
a layering arrangement that supplies an explicit aggregated cache for applications associated therewith, the layering arrangement includes:
a distributed object manager component that facilitates abstraction of the explicit aggregated cache in a distributed environment, to a single unified cache; and
an object manager component that manages policies associated with objects stored in each of nodes that form the single unified cache.

19. A computer-implemented method for implementing event notification in a distributed store that includes a plurality of different stores of a plurality of different nodes, each node storing data of the distributed stored that is associated with corresponding keys, comprising:
partitioning the distributed store into a hierarchically partitioned store having a plurality of different hierarchical levels, including at least a key level, a region level and a partition level;
hashing and mapping keys associated with data items of the distributed store into a routing table that maps the location of the data items having particular keys to different node stores and that identifies which partition and region each key corresponds to, wherein at least one region in the region level includes reference to a plurality of keys, and wherein at least one partition in the partition level includes reference to a plurality of regions;
maintaining a logical sequence number for changes occurring to the data items, for each level of the hierarchically partitioned store;
receiving a key level request from a client, which includes a specified logical sequence number and a specified key, for notifications corresponding to changes that have occurred to at least one data item associated with the specified key and corresponding to logical sequence numbers that sequentially follow the specified logical sequence number;
providing a block of one or more changes for the key level request to the client corresponding to key level changes that have been made to the key level associated with the specified key and specified logical sequence number of the hierarchically partitioned store; and
upon determining that a quantity of keys in a partition exceeds a predetermined threshold, switching to a partition level notification and subsequently providing a block of one or more changes corresponding to the partition level changes that have been made to the partition level associated with the specified key and specified logical sequence number of the hierarchically partitioned store.

* * * * *

UNITED STATES PATENT AND TRADEMARK OFFICE
CERTIFICATE OF CORRECTION

| | | |
|---|---|---|
| PATENT NO. | : 8,108,623 B2 | Page 1 of 1 |
| APPLICATION NO. | : 12/463745 | |
| DATED | : January 31, 2012 | |
| INVENTOR(S) | : Muralidhar Krishnaprasad et al. | |

It is certified that error appears in the above-identified patent and that said Letters Patent is hereby corrected as shown below:

IN THE CLAIMS:

In column 19, line 16, in Claim 9, after "employing" insert -- a --.

Signed and Sealed this
Twentieth Day of March, 2012

David J. Kappos
*Director of the United States Patent and Trademark Office*